United States Patent
Taguchi et al.

(10) Patent No.: US 9,709,106 B2
(45) Date of Patent: Jul. 18, 2017

(54) RAILWAY VEHICLE DISC BRAKE APPARATUS

(71) Applicant: NABTESCO CORPORATION, Tokyo (JP)

(72) Inventors: Akira Taguchi, Kobe (JP); Tadashi Yoshimura, Kobe (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 14/655,540

(22) PCT Filed: Dec. 19, 2013

(86) PCT No.: PCT/JP2013/084112
§ 371 (c)(1),
(2) Date: Jun. 25, 2015

(87) PCT Pub. No.: WO2014/103882
PCT Pub. Date: Jul. 3, 2014

(65) Prior Publication Data
US 2015/0353108 A1    Dec. 10, 2015

(30) Foreign Application Priority Data

Dec. 26, 2012 (JP) ................. 2012-283452

(51) Int. Cl.
*B61H 5/00* (2006.01)
*F16D 55/224* (2006.01)
(Continued)

(52) U.S. Cl.
CPC ........... *F16D 55/2245* (2013.01); *B61H 5/00* (2013.01); *F16D 65/18* (2013.01);
(Continued)

(58) Field of Classification Search
CPC .. F16D 55/2245; F16D 65/18; F16D 2125/00; F16D 2125/64; B61H 5/00
See application file for complete search history.

(56) References Cited

U.S. PATENT DOCUMENTS 2,348,077 A * 5/1944 Ledwinka ................ B61H 5/00
188/107
2,413,614 A * 12/1946 Eksergian ................ B61H 5/00
188/153 A
(Continued)

FOREIGN PATENT DOCUMENTS

CN          1862049 A     11/2006
CN        201027852 Y      2/2008
(Continued)

OTHER PUBLICATIONS

English machine translation of JP 2010-164183 A (Hideki).*
(Continued)

*Primary Examiner* — Bradley King
(74) *Attorney, Agent, or Firm* — Pillsbury Winthrop Shaw Pittman LLP

(57) ABSTRACT

Provided is a railway vehicle disc brake apparatus that is capable of ensuring sufficient strength and that can be reduced in weight. The railway vehicle disc brake apparatus has: a pair of calliper levers for supporting a pair of pads; a pair of fulcrum shaft members that pivotally support the pair of calliper levers; and a cylinder device for driving the pair of calliper levers around the pair of fulcrum shaft members. Arm sections of the calliper lever have first and second portions that extend in such a manner as to intersect each other in a cross section that is perpendicular to the direction in which said arm sections extend.

7 Claims, 14 Drawing Sheets

(51) Int. Cl.
*F16D 65/18* (2006.01)
*F16D 121/04* (2012.01)
*F16D 121/08* (2012.01)
*F16D 125/64* (2012.01)

(52) U.S. Cl.
CPC ...... *F16D 2121/04* (2013.01); *F16D 2121/08* (2013.01); *F16D 2125/64* (2013.01)

(56) References Cited

U.S. PATENT DOCUMENTS

| | | | |
|---|---|---|---|
| 4,473,136 A | 9/1984 | Emilsson et al. | |
| 2010/0025166 A1 | 2/2010 | Suzuki et al. | |
| 2015/0353107 A1* | 12/2015 | Taguchi | B61H 5/00 188/72.9 |

FOREIGN PATENT DOCUMENTS

| | | |
|---|---|---|
| CN | 101568743 A | 10/2009 |
| JP | 57-501277 A | 7/1982 |
| JP | 59-124254 U | 8/1984 |
| JP | H11-124934 A | 5/1999 |
| JP | 2005-024054 A | 1/2005 |
| JP | 2005-075129 A | 3/2005 |
| JP | 2006-315422 A | 11/2006 |
| JP | 2008-020014 A | 1/2008 |
| JP | 2010-164183 A | 7/2010 |
| JP | 2012-052586 A | 3/2012 |
| WO | WO 82/00619 | 3/1982 |
| WO | WO 2011/155684 A1 | 12/2011 |

OTHER PUBLICATIONS

English machine translation of JP 2005-075129 A (Takayuki).*
English machine translation of JP 2008-020014 A (Tadashi).*
International Preliminary Report on Patentability and the Written Opinion of the International Searching Authority as issued in International Patent Application No. PCT/JP2013/084112, dated Jun. 30, 2015.
International Search Report as issued in International Patent Application No. PCT/JP2013/084112, dated Apr. 1, 2014.
Non-Final Office Action as issued in Japanese Patent Application No. 2014-554384, dated Apr. 26, 2016.
First Office Action as issued in Chinese Patent Application No. 201380067798.5, dated Aug. 29, 2016.

* cited by examiner

RAILWAY VEHICLE DISC BRAKE APPARATUS

CROSS-REFERENCE TO RELATED APPLICATIONS

This application is the U.S. National Stage of PCT/JP2013/084112, filed Dec. 19, 2013, which in turn claims priority to Japanese Patent Application No. JP 2012-283452, filed Dec. 26, 2012. The contents of these applications are incorporated herein by reference in their entireties.

TECHNICAL FIELD

The present invention relates to a disc brake apparatus for a railway vehicle.

BACKGROUND ART

A known disc brake apparatus for a railway vehicle is configured to use the principle of leverage (e.g., refer to patent document 1). Patent document 1 describes a disc brake apparatus that includes a pair of brake pad holders, a pair of arms, and a drive mechanism.

The brake pad holders are arranged to sandwich a disc, which rotates integrally with a vehicle wheel. The brake pad holders hold a pair of pads. The brake pad holders are coupled to a pair of arms. Each arm is pivotal about a fulcrum shaft extending in a generally vertical direction. Each arm is connected to the drive mechanism. The drive mechanism drives each arm so that the arm pivots about the fulcrum shaft. This structure rotates the arms. Consequently, the pads, which are held by the brake pad holders on the arms, contact the disc and apply a braking force to the disc.

Patent Document 1: Japanese Laid-Open Patent Publication No. 2010-164183 ("abstract")

SUMMARY OF THE INVENTION

When applying the brakes on a railway vehicle, arms receive a large load from a drive mechanism and a large reaction force from a disc. Thus, the arms are shaped to have sufficient strength. Additionally, the arms are large in size to correspond to a large railway vehicle disc. The arms each have a cross-sectional shape (cross-sectional shape orthogonal to a direction in which the arm extends) that is polygonal, elliptical, or the like.

In this manner, the arms are formed to have sufficient strength. However, when simply increasing the thickness of the arms to obtain sufficient strength, the arms would become thicker than necessary. That is, the arms would be excessively heavy.

To solve the above problem, it is an object of the present invention to provide a railway vehicle disc brake apparatus that obtains sufficient strength and is reduced in weight.

(1) To solve the above problem, one aspect of the present invention is a railway vehicle disc brake apparatus that includes a caliper lever, a fulcrum shaft, and a drive device. The caliper lever supports a pad, which is opposed to a disc. The fulcrum shaft pivotally supports the caliper lever so that the pad is movable in a direction extending toward the disc and in a direction extending away from the disc. The drive device drives the caliper lever about the fulcrum shaft. The caliper lever includes an arm. The arm includes a first part and a second part that extend and intersect each other in a cross-section orthogonal to a direction in which the arm extends.

In this structure, in the cross-section orthogonal to the direction the arm extends, the arm has the form of, for example, a tetragon or a circle that is partially omitted. This decreases the volume of the arm. Thus, the arm may be further reduced in weight. That is, the weight reduction of the caliper lever results in weight reduction of the railway vehicle disc brake apparatus. Additionally, such a shape allows the arm to have sufficient bending rigidity. Thus, the arm, which receives a large load from the drive device and a large reaction force from the disc, may obtain sufficient strength.

This provides a railway vehicle disc brake apparatus that obtains sufficient strength and is reduced in weight.

(2) Preferably, during use of the railway vehicle disc brake apparatus, in the cross-section, an angle between a vertical direction and a direction in which the first part extends is smaller than an angle between the vertical direction and a direction in which the second part extends.

In this structure, the first part extending at an angle relatively close to vertical cooperates with the second part extending at an angle relatively close to horizontal to obtain sufficient bending rigidity of the arm.

(3) More preferably, the arm is L-shaped in the cross-section.

This structure reduces the weight of the arm and obtains sufficient rigidity of the arm in a simple manner.

(4) Preferably, the arm is arranged so that an inner surface is opposed to the drive device and an outer surface is arranged to be paired with the inner surface. The arm includes an effort-side arm and a load-side arm. The effort-side arm extends between the drive device and the fulcrum shaft. The load-side arm extends from a side of the fulcrum shaft toward a side of the pad. In the effort-side arm, the first part is located at a side of the outer surface and the second part is located at a side of the inner surface.

This structure obtains a cavity defined by the first part and the second part at the side of the inner surface of the effort-side arm. Thus, a component located adjacent to the effort-side arm, such as the drive device, may be located in the cavity. This prevents interference (unintentional contact) of the effort-side arm with the drive device or the like. Moreover, the effort-side arm does not need to have a circuitous shape to avoid such interference. This reduces the size of the effort-side arm. Particularly, the effort-side arm may be shortened in the front-rear direction.

(5) Preferably, the arm is arranged so that an inner surface is opposed to the drive device and an outer surface is arranged to be paired with the inner surface. The arm includes an effort-side and a load-side arm. The effort-side arm extends between the drive device and the fulcrum shaft. The load-side arm extends from a side of the fulcrum shaft toward a side of the pad. In the load-side arm, the first part is located at a side of the inner surface and the second part is located at a side of the outer surface.

In this structure, when applying the brakes on the vehicle, the load-side arm receives a reaction force from the disc and warps into an arch-like shape. In this case, tensile stress is generated in the inner surface of the load-side arm, and compressive stress is generated in the outer surface of the load-side arm. In general, a component has a tensile stress tolerance that is lower than a compressive stress tolerance. Thus, in the load-side arm, the first part is located at the side of the inner surface, in which tensile stress is generated when applying the brakes on the vehicle. This further increases the volume of a portion receiving the tensile stress and decreases the peak of the tensile stress of the load-side arm. Consequently, such a decrease in the load of the load-side arm further increases the strength of the caliper lever.

(6) More preferably, the load-side arm is set to be shorter in overall length than the effort-side arm.

In this structure, the load-side arm is short in overall length. Thus, the railway vehicle disc brake apparatus may be further reduced in size. Additionally, since the load-side arm is short in overall length (arm length), when applying the brakes on the vehicle, the stress of the load-side arm tends to be increased when the load-side arm warps due to the reaction force from the disc. However, in the load-side arm, the first part is located at the side of the inner surface of the load-side arm. This disperses the tensile stress at the side of the inner surface of the load-side arm and decreases the peak of the tensile stress generated in the load-side arm to a sufficiently low value.

(7) Preferably, the effort-side arm is one of two effort-side arms located one above the other. The caliper lever further includes a connector that connects the first parts of the effort-side arms.

In this structure, the effort-side arms are located one above the other and connected integrally by the connector. This significantly improves the strength of the effort-side arms. Such improved strength of the effort-side arms further increases the strength of the caliper lever. Additionally, the connector extends between the first parts of the effort-side arms. Thus, portions connecting the connector and the effort-side arms may be smoothly formed. This loosens stress concentration on the portions connecting the connector and the effort-side arms.

(8) Preferably, the railway vehicle disc brake apparatus further includes a lever support member that supports the caliper lever with the fulcrum shaft. The lever support member includes two horizontal portions, a vertical portion, and a reinforcement rib. The two horizontal portions are located one above the other and extend in a predetermined layout direction in which the caliper lever and the drive device are laid out. The vertical portion extends in a direction in which the two horizontal portions are opposed to each other and connects the two horizontal portions. The reinforcement rib is connected to the two horizontal portions and the vertical portion.

This structure allows the lever support member to have a form similar to combined plates rather than the form of a block. Thus, the lever support member may be further reduced in weight. Additionally, the reinforcement rib allows the lever support member to obtain sufficient strength.

(9) More preferably, the vertical portion is configured to be opposed to the disc. The reinforcement rib extends from the vertical portion toward the drive device.

In this structure, the vertical portion is located proximate to the disc. In the lever support member, this ensures that the vertical portion receives a reaction force from the disc.

(10) Preferably, the railway vehicle disc brake apparatus further includes a suspension shaft that pivotally suspends the lever support member from a chassis. The suspension shaft includes a small diameter portion and a large diameter portion. The small diameter portion is located toward the drive device. The large diameter portion is configured to be located toward the pad and has a larger diameter than the small diameter portion.

In this structure, in the suspension shaft, when applying the brakes on the vehicle, the large diameter portion receives a large reaction force from the disc. Thus, the diameter of the large diameter portion is set to be large so that the suspension shaft obtains sufficient strength. Additionally, when applying the brakes on the vehicle, the small diameter portion receives a relatively small reaction force from the disc. Thus, the small diameter portion, which serves as a portion of the suspension shaft that is free from a large load, has a small diameter. This reduces the weight of the suspension shaft.

EFFECT OF THE INVENTION

The present invention provides a railway vehicle disc brake apparatus that obtains sufficient strength and is reduced in weight.

EMBODIMENTS OF THE INVENTION

One embodiment of the present invention will now be described with reference to the drawings. The present invention is not limited to the embodiment described below and may be widely applied as a railway vehicle disc brake apparatus.

Figure 1:
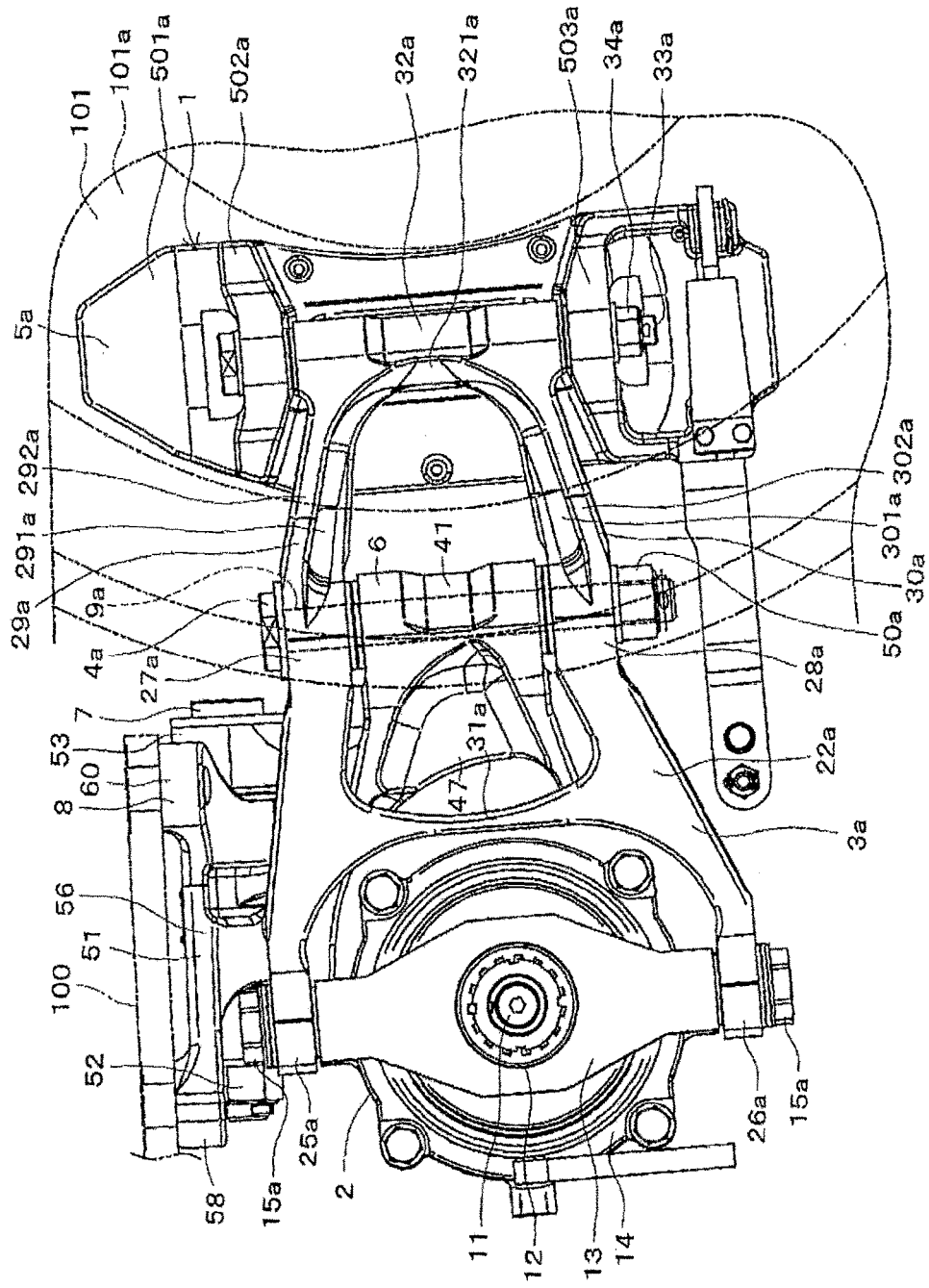
FIG. 1 is a side view of one embodiment of a railway vehicle disc brake apparatus according to the present invention.
Figure 2:
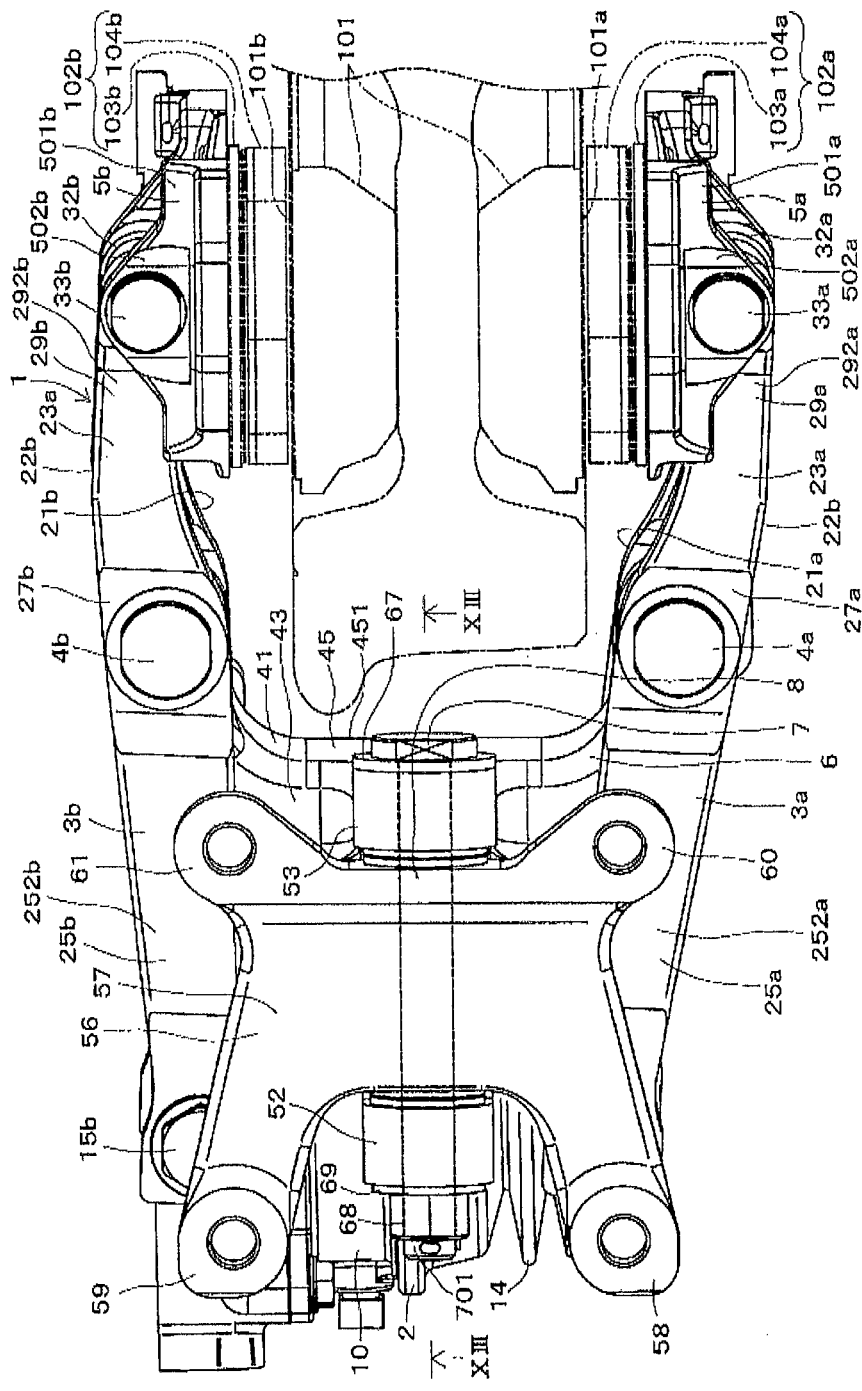
FIG. 2 is a plan view of the railway vehicle disc brake apparatus.
Figure 3:
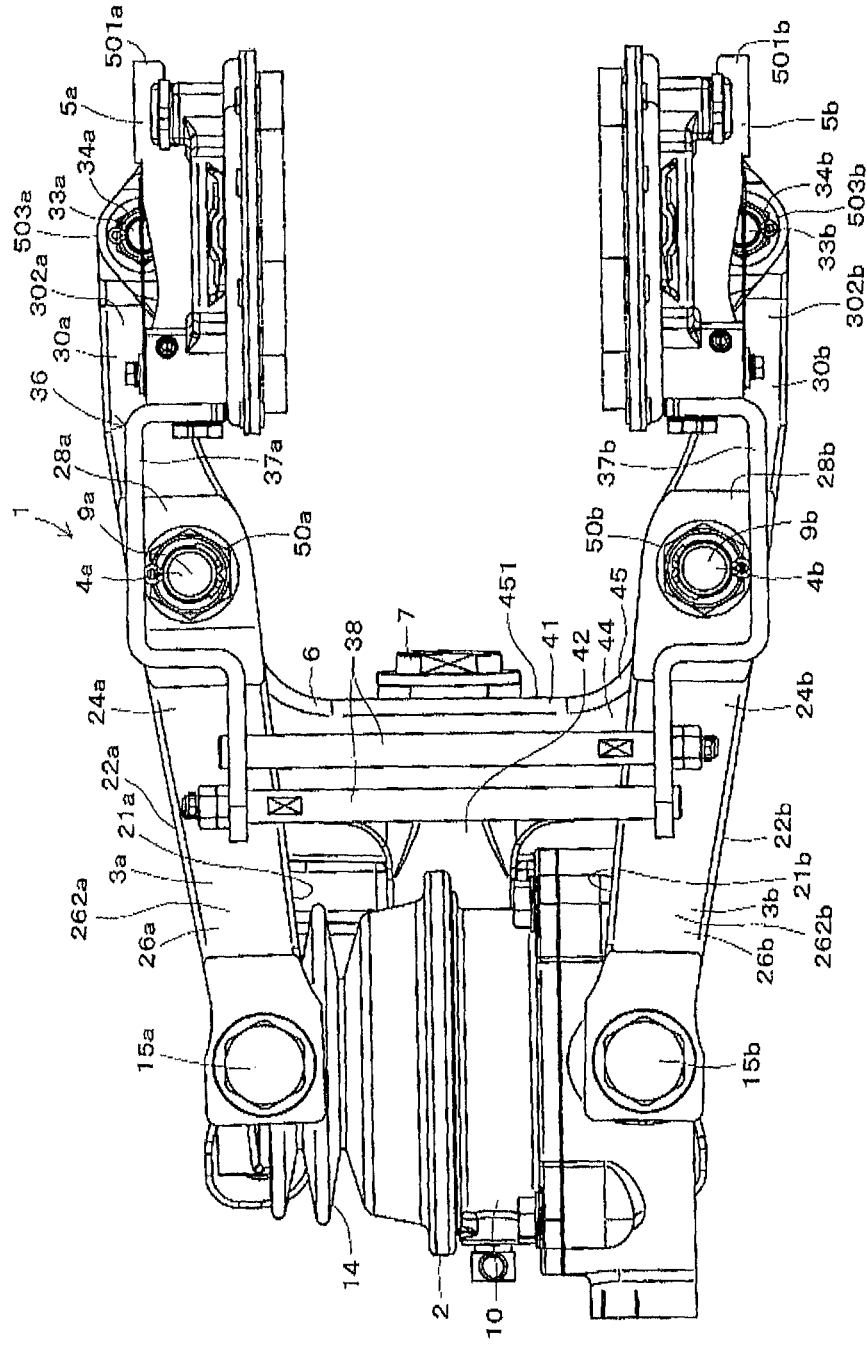
FIG. 3 is a bottom view of the railway vehicle disc brake apparatus.
Figure 4:
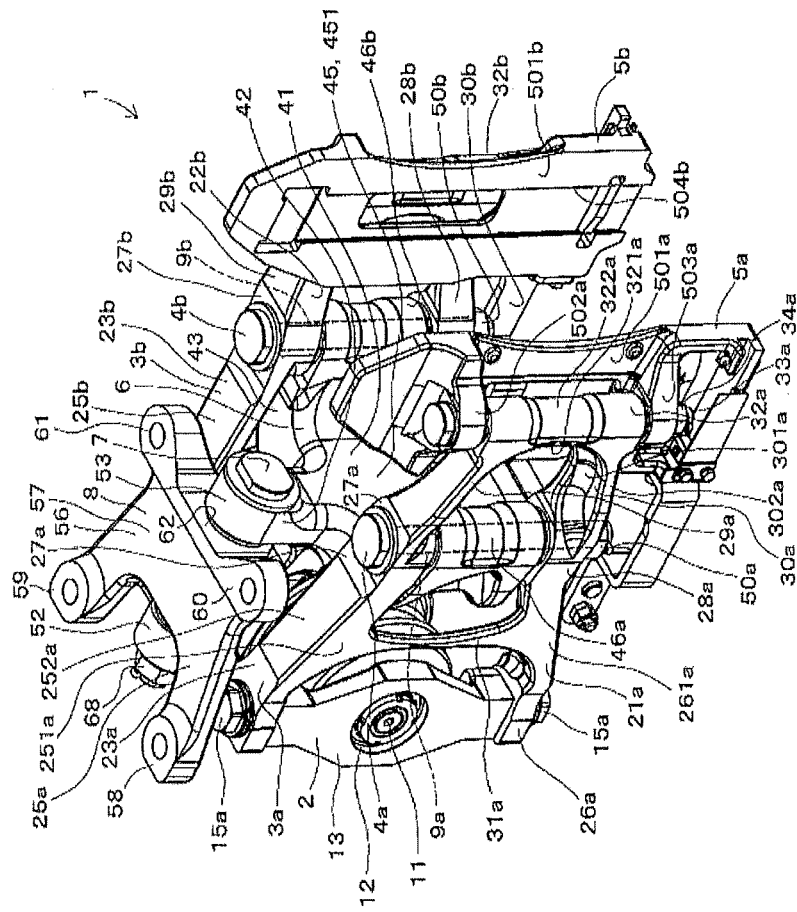
FIG. 4 is a perspective view of the railway vehicle disc brake apparatus as viewed from above.
Figure 5:
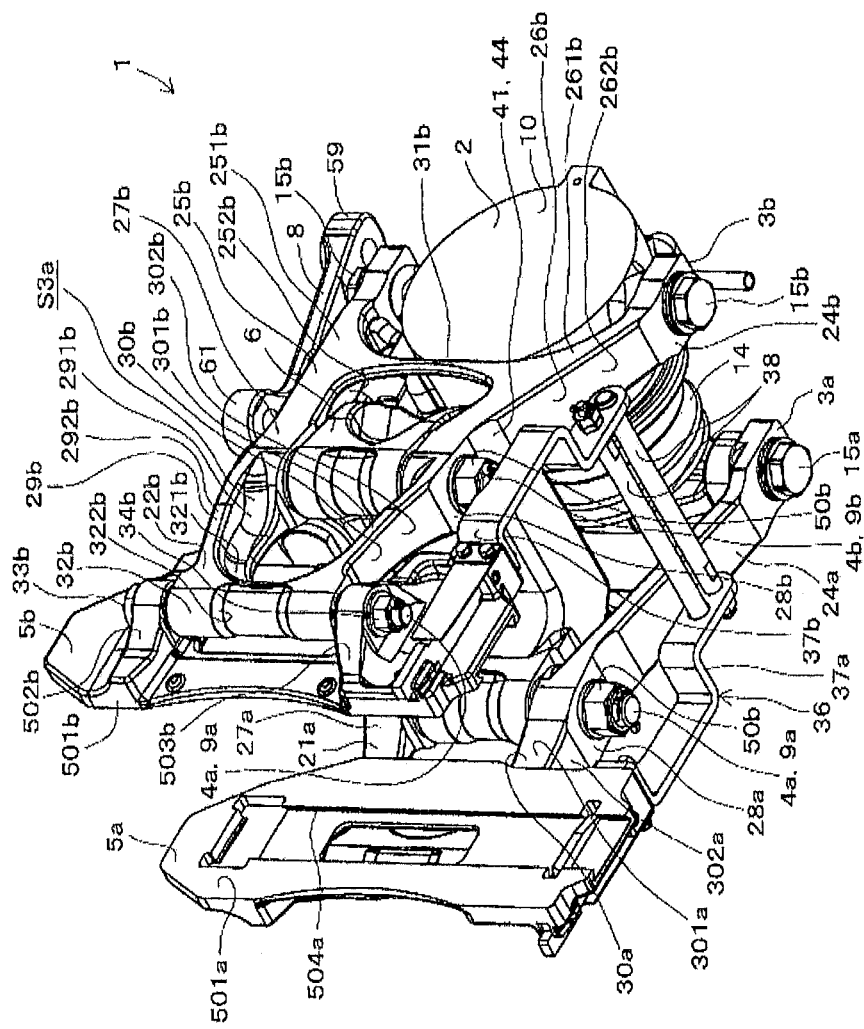
FIG. 5 is a perspective view of the railway vehicle disc brake apparatus as viewed from below.

FIG. 1 is a side view of one embodiment of a railway vehicle disc brake apparatus 1 according to the present invention. FIG. 1 shows when the vehicle disc brake apparatus 1 is mounted on a chassis 100. FIG. 2 is a plan view of the railway vehicle disc brake apparatus 1. FIG. 3 is a bottom view of the railway vehicle disc brake apparatus 1. In FIGS. 1 to 3, components other than the railway vehicle disc brake apparatus 1 are shown in the double-dashed lines, which are imaginary lines. FIG. 4 is a perspective view of the railway vehicle disc brake apparatus 1 as viewed from above. FIG. 5 is a perspective view of the railway vehicle disc brake apparatus 1 as viewed from below.

Referring to FIGS. 1 and 2, a railway vehicle includes the railway vehicle disc brake apparatus 1 (hereafter, may be simply referred to as the brake apparatus 1). The brake apparatus 1 is located on a lower portion of the chassis 100 of the railway vehicle (hereafter, may be simply referred to as the vehicle). The vehicle disc brake apparatus 1 is adjacent to a disc 101, which is located at the lower portion of the chassis 100. The disc 101, which is a disc-shaped member, rotates together with a wheel when the vehicle is traveling. The brake apparatus 1 holds the disc 101 to apply a friction force to the disc 101. This applies a braking force to the disc 101 and decelerates the vehicle.

The brake apparatus 1 includes a cylinder device 2 (drive device), two caliper levers 3a, 3b, fulcrum shaft members 4a, 4b, two pad holders 5a, 5b, a lever support member 6, a suspension shaft member 7, and a fixing bracket 8.

Hereafter, the frame of reference for the vertical direction, the front-rear direction, and the lateral direction is the brake apparatus 1 mounted on the chassis 100 that is located on a horizontal surface for use. The lateral direction is the direction in which the caliper levers 3a, 3b are opposed to each other. The front-rear direction is the direction in which the caliper levers 3a, 3b extend. Hereafter, the structure of the vehicle disc brake apparatus 1, which is not operated, will be described unless otherwise specified.

Referring to FIGS. 2, 3, and 5, the cylinder device 2 is arranged so that the caliper levers 3a, 3b pivot about fulcrum shafts 9a, 9b of the fulcrum shaft members 4a, 4b extending in the vertical direction. In the present embodiment, the fulcrum shaft members 4a, 4b are each a threaded member. The fulcrum shafts 9a, 9b are each a round shaft including a male-threaded distal end. The cylinder device 2 uses a fluid, such as air or oil, as a hydraulic fluid. The cylinder device 2 is opposed to the disc 101 in the front-rear direction. The cylinder device 2 is also sandwiched between the caliper levers 3a, 3b.

The cylinder device 2 includes a cylinder housing 10, a rod 11, a coupling 12, a column 13, and a boot 14.

The cylinder housing 10 is hollow. The cylinder housing 10 includes an upper end portion and a lower end portion, which are rotationally supported by threaded members 15b, 15b on the caliper lever 3b. The cylinder housing 10 supports the rod 11.

The rod 11 moves in the lateral direction when the fluid moves in a cylinder chamber (not shown) of the cylinder housing 10. The coupling 12 couples a distal end of the rod 11 and the column 13.

The column 13 extends vertically. The column 13 is configured to move in the lateral direction integrally with the rod 11 through the coupling 12. The column 13 includes an upper end portion and a lower end portion, which are rotationally supported by threaded members 15a, 15a on the caliper lever 3b.

The boot 14 is located between the column 13 and the cylinder housing 10. The boot 14 is bellows-shaped and capable of expanding and contracting. The boot 14 surrounds the rod 11. The cylinder device 2 is located between the caliper levers 3a, 3b.

The two caliper levers 3a, 3b support two pads 102a, 102b, which are located at opposite sides of the disc 101. The caliper levers 3a, 3b respectively pivot about the fulcrum shafts 9a, 9b of the fulcrum shaft member 4a, 4b to press the pads 102a, 102b to side surfaces 101a, 101b of the disc 101. In the present embodiment, the caliper levers 3a, 3b are each a metal formed by casting, forging, sintering, or other manufacturing processes. In the present embodiment, the caliper levers 3a, 3b are each a solid member and include no inner cavity other than through holes.

The caliper levers 3a, 3b are arranged so that the cylinder device 2 and the disc 101 are located between the caliper levers 3a, 3b. The caliper levers 3a, 3b each extend in the front-rear direction from a location adjacent to the cylinder device 2 to a location adjacent to the disc 101. The caliper levers 3a, 3b are each elongated in the front-rear direction. In the present embodiment, the caliper levers 3a, 3b are each generally A-shaped as viewed from beside (FIG. 1).

Figure 6:
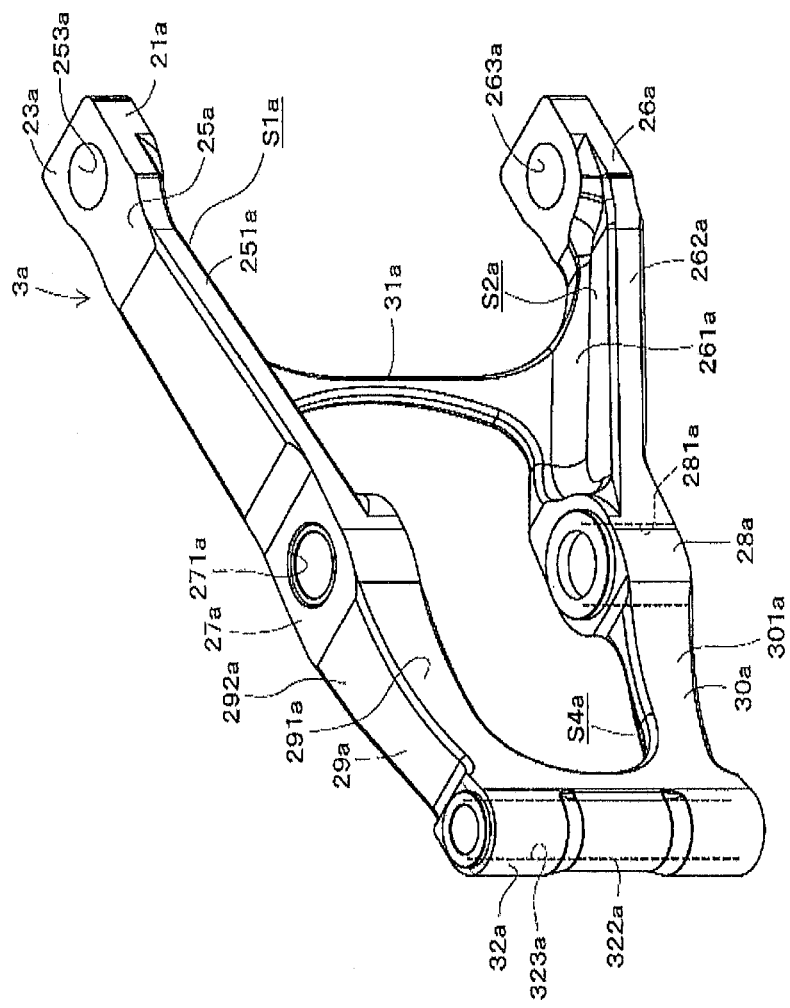
FIG. 6 is a perspective view of a caliper lever showing an inner surface of the caliper lever.
Figure 7:
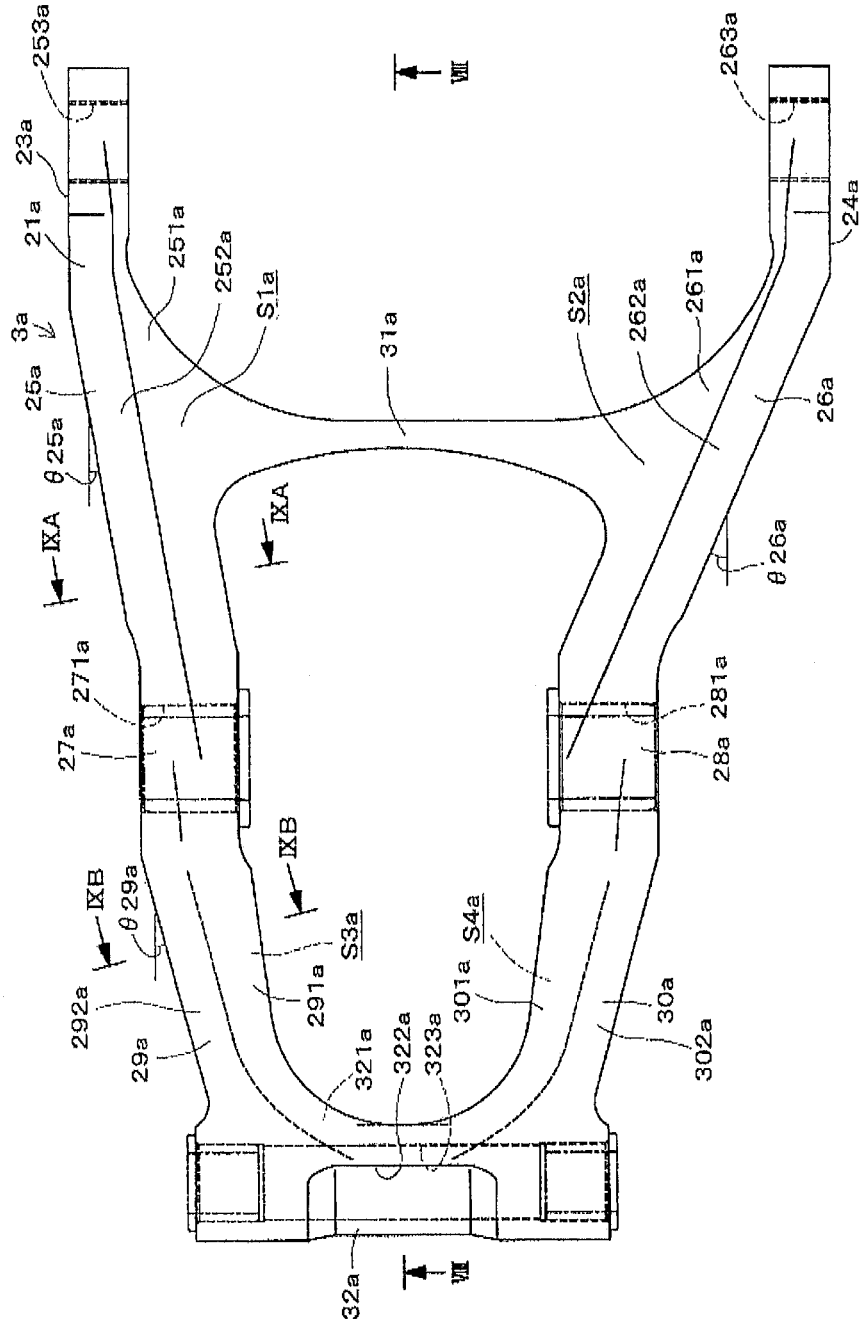
FIG. 7 is a side view of the caliper lever showing the inner surface of the caliper lever.
Figure 8:
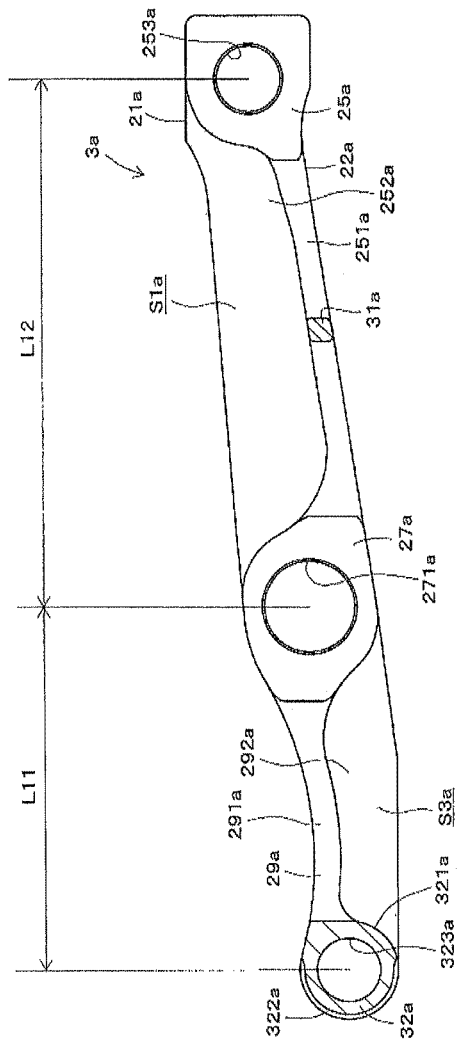
FIG. 8 is a cross-sectional view taken along line VIII-VIII of FIG. 7 as the caliper lever is viewed from below.
Figure 9A:
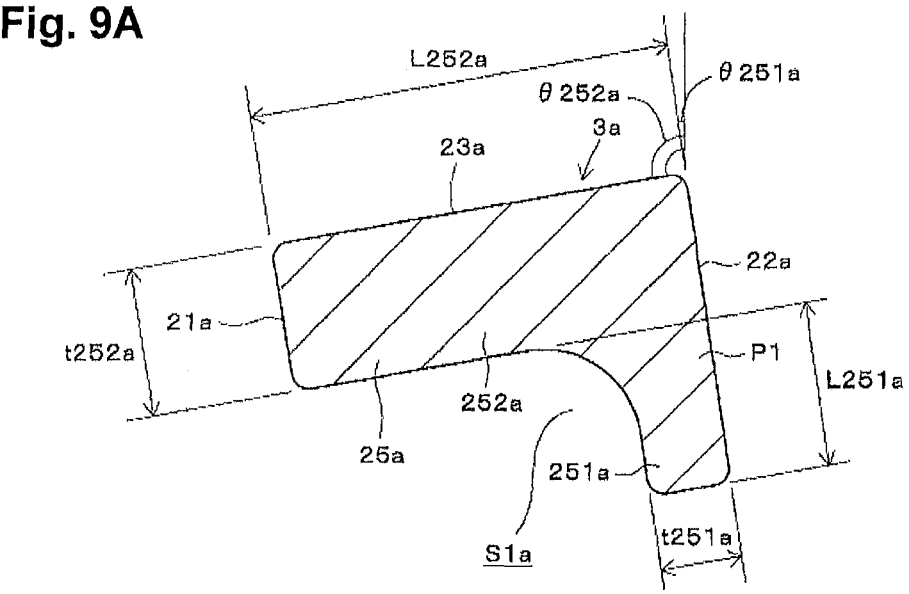
FIG. 9A is a cross-sectional view taken along line IXA-IXA of FIG. 7.
Figure 9B:
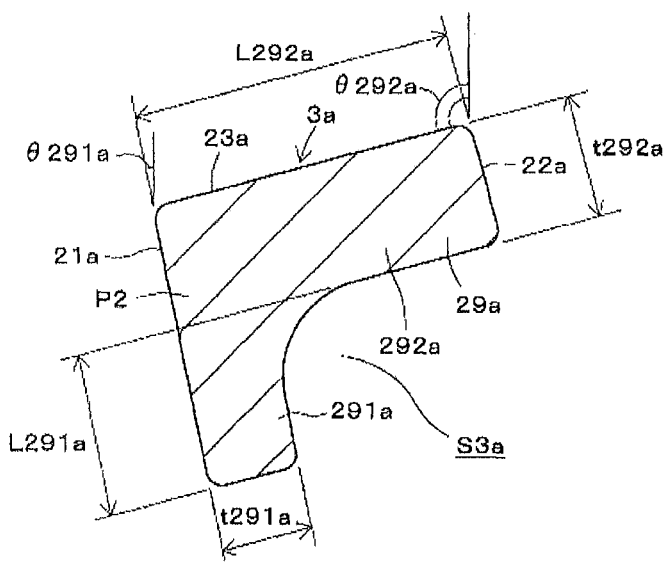
FIG. 9B is a cross-sectional view taken along line IXB-IXB of FIG. 7.

FIG. 6 is a perspective view of the caliper lever 3a showing an inner surface 21a of the caliper lever 3a. FIG. 7 is a side view of the caliper lever 3a showing the inner surface 21a of the caliper lever 3a. FIG. 8 is a cross-sectional view taken along line VIII-VIII of FIG. 7 as the caliper lever 3a is viewed from below. FIG. 9A is a cross-sectional view taken along line IXA-IXA of FIG. 7. FIG. 9B is a cross-sectional view taken along line IXB-IXB of FIG. 7.

Referring to FIGS. 1 and 6 to 9B, the caliper lever 3a is arranged to be inclined so that the caliper lever 3a is closer to the ground surface as the distance from the disc 102 increases in the front-rear direction. However, the gradient of the caliper lever 3a is a few degrees, or slight, relative to a horizontal plane (ground surface). Thus, in the description hereafter, the inclination will be considered as substantially zero.

The caliper lever 3a includes the inner surface 21a, which is opposed to the cylinder device 2, an outer surface 22a, which is opposed to an outer side of the brake apparatus 1 and paired with the inner surface 21a, an upper surface 23a oriented upward, and a lower surface 24a oriented downward.

The caliper lever 3a also includes two effort-side arms 25a, 26a, which are located one above the other, two fulcrum portions 27a, 28a, which are located one above the other, two load-side arms 29a, 30a, which are located one above the other, a first connector 31a, and a second connector 32a.

The effort-side arms 25a, 26a and the load-side arms 29a, 30a are each an example of an "arm" of the present invention.

The effort-side arms 25a, 26a extend between the cylinder device 2 and the fulcrum shaft member 4a. The effort-side arm 25a is located above the effort-side arm 26a. The effort-side arms 25a, 26a each include a first end in the front-rear direction that defines a first end, in the front-rear direction, of the caliper lever 3a. The first ends of the effort-side arms 25a, 26a each have the form of a flat and tetragonal plate and respectively include through holes 253a, 263a, extending in the vertical direction. The threaded members 15a, 15a are inserted into the through holes 253a, 263a.

The effort-side arm 25a includes an intermediate portion and a second end in the front-rear direction that are inclined downward so as to become lower as the first end of the effort-side arm 25a becomes farther. In contrast, the effort-side arm 26a includes an intermediate portion and a second end in the longitudinal direction that are inclined upward so as to become higher as the first end of the effort-side arm 26a becomes farther. The angle (inclination angle) formed by the horizontal plane and the intermediate portion and the second end of the effort-side arm 26a is larger than the inclination angle formed by the horizontal plane and the intermediate portion and the second end of the effort-side arm 25a.

The intermediate portion and the second end of the effort-side arm 25a include a first part 251a and a second part 252a.

In a cross-section P1 (cross-section shown in FIG. 9A) that is orthogonal to a direction the effort-side arm 25a extends, the first part 251a and the second part 252a are L-shaped as a whole. In the cross-section P1, the first part 251a and the second part 252a extend and intersect each other. In the present embodiment, the first part 251a and the second part 252a extend orthogonal to each other.

Additionally, in the cross-section P1, an angle θ251a (minor angle) between the vertical direction and a direction in which the first part 251a extends is smaller than an angle θ252a (minor angle) between the vertical direction and a direction in which the second part 252a extends (θ251a<θ252a). The angle θ251a refers to, for example, the angle between the outer surface 22a in the first part 251a and the vertical direction. Also, the angle θ252a refers to, for example, the angle between the upper surface 23a in the second part 252a and the vertical direction. In the present embodiment, the first part 251a extends at an angle close to vertical. The second part 252a extends at an angle close to horizontal. However, the first part 251a may extend vertically, and the second part 252a may extend horizontally.

In the cross-section P1, the thickness t251a of the first part 251a is less than the thickness t252a of the second part 252a (t251a<t252a). In the present embodiment, in the cross-section P1, the length L251a of the first part 251a is less than the length L252a of the second part 252a (L251a<L252a). The inner surface 21a includes a portion that connects the first part 251a and the second part 252a and has the form of a smooth arc. This limits the occurrence of stress concentration on the connecting portion.

The first part 251a is located toward the outer surface 22a of the caliper lever 3a and forms a portion of the outer surface 22a. The second part 252a is located toward the inner surface 21a of the caliper lever 3a and forms a portion of the inner surface 21a. Additionally, the first part 251a and the second part 252a define a cavity S1a. The cavity S1a is located between the caliper levers 3a, 3b. The boot 14 of the cylinder device 2 or the like may be located in the cavity S1a. The intermediate portion and the second end of the effort-side arm 26a are located below the first part 251a and the second part 252a, which have the structure described above.

The intermediate portion and the second end of the effort-side arm 26a include a first part 261a and a second part 262a.

The intermediate portion and the second end of the effort-side arm 26a have generally the same structure as the intermediate portion and the second end of the effort-side arm 25a.

More specifically, in a cross-section (not shown) orthogonal to a direction the effort-side arm 26a extends, the first part 261a and the second part 262a of the effort-side arm 26a are L-shaped as a whole. The first part 251a and the second part 262a extend and intersect each other. In the present embodiment, the first part 261a and the second part 262a extend orthogonal to each other.

Additionally, the lower first and second parts 261a, 262a in a cross-section orthogonal to the direction in which the effort-side arm 26a extends are shaped to be generally symmetrical to the upper first and second parts 251a, 252a in the cross-section P1 orthogonal to the direction the effort-side arm 25a extends.

The first part 261a is located toward the outer surface 22a of the caliper lever 3a and forms a portion of the outer surface 22a. The second part 262a is located toward the inner surface 21a of the caliper lever 3a and forms a portion of the inner surface 21a. Additionally, the first part 261a and the second part 262a define a cavity S2a. The cavity S2a is located between the caliper levers 3a, 3b. The boot 14 of the cylinder device 2 or the like may be located in the cavity S2a.

The first connector 31a connects the effort-side arms 25a, 26a, which have the structure described above.

The first connector 31a extends between the first parts 251a, 261a of the effort-side arms 25a, 26a and is continuous with each of the first parts 251a, 261a. The first connector 31a extends generally parallel to the vertical direction. The first connector 31a is shaped to be narrow in the middle as viewed from beside. In the present embodiment, the thickness (length in the lateral direction) of the first connector 31a is set to be generally constant. The first connector 31a is smoothly continuous with each of the first parts 251a, 261a. This limits the occurrence of stress concentration on portions connecting the first connector 31a and the first parts 251a, 261a. The fulcrum portions 27a, 28a, which are located one above the other, are arranged to be aligned with the first connector 31a in the front-rear direction.

The fulcrum portions 27a, 28a are each coupled to the fulcrum shaft member 4a. The fulcrum portions 27a, 28a are each block-shaped. The fulcrum portion 27a is located above the fulcrum portion 28a. The fulcrum portion 27a is shaped to be smoothly continuous with the effort-side arm 25a and the load-side arm 29a. This limits the occurrence of stress concentration. In the same manner, the fulcrum portion 28a is shaped to be smoothly continuous with the effort-side arm 26a and the load-side arm 30a. This limits the occurrence of stress concentration. The fulcrum portions 27a, 28a respectively include through holes 271a, 281a extending vertically. A tubular bushing is fitted into each of the through holes 271a, 281a. The fulcrum portions 27a, 28a are each coupled to the fulcrum shaft member 4a by the corresponding bushing. The fulcrum portions 27a, 28a are respectively continuous with the load-side arms 29a, 30a, which are located one above the other.

Figure 10:
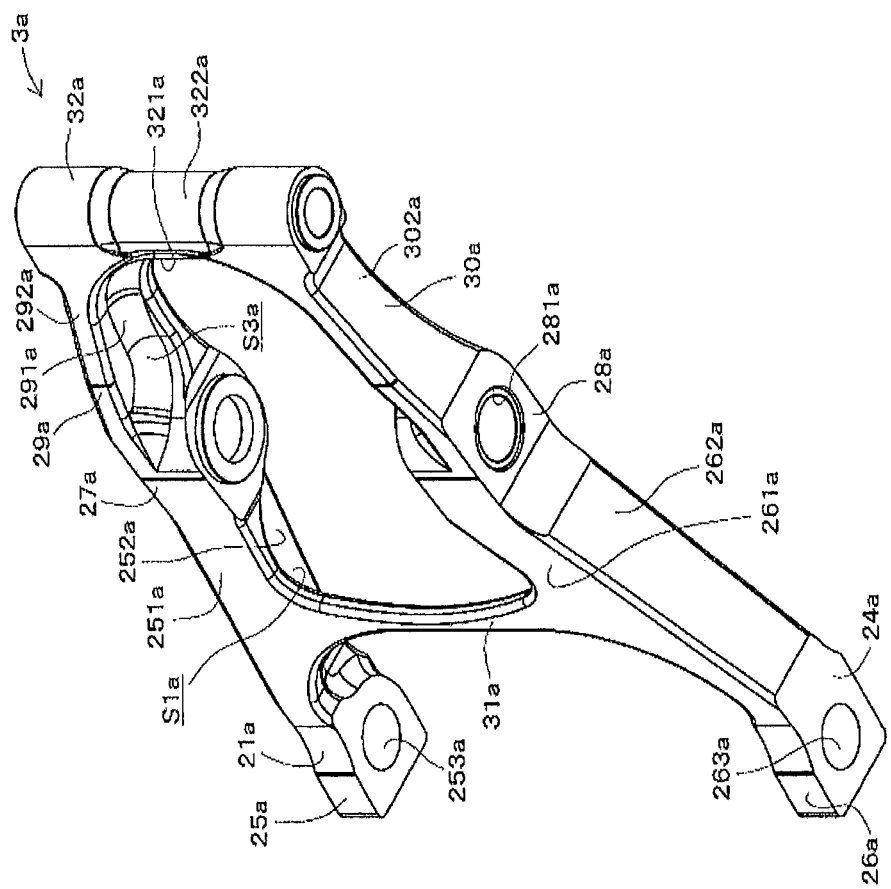
FIG. 10 is a perspective view of the caliper lever showing an outer surface of the caliper lever.

FIG. 10 is a perspective view of the caliper lever 3a Showing the outer surface 22a of the caliper lever 3a. Referring to FIGS. 1 and 7 to 10, the load-side arms 29a, 30a extend from the side of the fulcrum shaft member 4a toward the side of the pad 102a (pad holder 5a). The load-side arm 29a is located above the load-side arm 30a. The load-side arms 29a, 30a each include a first end that is continuous with the corresponding one of the fulcrum portions 27a, 28a.

The load-side arm 29a is inclined and extends downward from the first end of the load-side arm 29a toward the second connector 32a. In the same manner, the load-side arm 30a is inclined and extends upward from the first end of the load-side arm 30a toward the second connector 32a. The upper load-side arm 29a is shaped to be symmetrical to the lower load-side arm 30a. As viewed from beside (FIG. 7), an angle θ29a between the horizontal plane and the load-side arm 29a is substantially the same as an angle θ25a between the horizontal plane and the intermediate portion and the second end of the effort-side arm 25a. The angle θ29a is smaller than an angle θ26a between the horizontal plane and the intermediate portion and the second end of the effort-side arm 26a (θ29a<θ26a).

In the present embodiment, the angle θ29a is formed by the upper surface 23a in the load-side arm 29a and the horizontal plane. The angle θ25a is formed by the upper surface 23a in the effort-side arm 25a and the horizontal plane. The angle θ26a is formed by the lower surface 24a in the effort-side arm 26a and the horizontal plane.

The load-side arm 29a includes a first part 291a and a second part 292a.

In a cross-section P2 (cross-section shown in FIG. 9B) that is orthogonal to a direction the load-side arm 29a extends, the first part 291a and the second part 292a are L-shaped as a whole. In the cross-section P2, the first part 291a and the second part 292a extend and intersect each other. In the present embodiment, the first part 291a and the second part 292a extend orthogonal to each other.

Additionally, in the cross-section P2, an angle θ291a (minor angle) between the vertical direction and a direction in which the first part 291a extends is smaller than an angle θ292a (minor angle) between the vertical direction and a direction in which the second part 292a extends (θ291a<θ292a). The angle θ291a refers to, for example, an angle between the inner surface 21a in the first part 291a and the vertical direction. Also, the angle θ292a refers to, for example, an angle between the upper surface 23a in the second part 292a and the vertical direction. In the present embodiment, the first part 291a extends at an angle close to the vertical line. The second part 292a extends at an angle close to the horizontal line. However, the first part 291a may extend vertically. The second part 292a may extend horizontally.

In the cross-section P2, the thickness t291a of the first part 291a is less than the thickness t292a of the second part 292a (t291a<t292a). In the present embodiment, in the cross-section P2, the length L291a of the first part 291a is less than the length L292a of the second part 292a (L291a<L292a). The outer surface 22a includes a portion that connects the first part 291a and the second part 292a and has the form of a smooth arc. This limits the occurrence of stress concentration on the connecting portion.

The first part 291a is located toward the inner surface 21a of the caliper lever 3a and forms a portion of the inner surface 21a. The second part 292a is located toward the outer surface 22a of the caliper lever 3a and forms a portion of the outer surface 22a. Additionally, the first part 291a and the second part 292a define a cavity S3a. The cavity S3a is opposed to the outer side of the brake apparatus 1. The load-side arm 30a is located below the load-side arm 29a, which has the structure described above.

The load-side arm 30a includes a first part 301a and a second part 302a.

As described above, the lower load-side arm 30a is shaped to be symmetrical to the upper load-side arm 29a. Thus, the load-side arm 30a will not be described in detail.

The load-side arms 29a, 30a each include a second end. The second connector 32a connects the second ends of the load-side arms 29a, 30a.

The second connector 32a is configured to hold the pad holder 5a. The second connector 32a defines a second end, in the front-rear direction, of the caliper lever 3a. The second connector 32a is tubular and extends vertically. The second connector 32a includes an upper portion, which is continuous with the second end of the load-side arm 29a. The second connector 32a includes a lower portion, which is continuous with the second end of the load-side arm 30a. The outer surface 22a in the second connector 32a includes a recess 321a. The recess 321a is arc-shaped as viewed from beside and smoothly continuous with the outer surface 22a in each of the load-side arms 29a, 30a. This limits the occurrence of stress concentration. Additionally, the second connector 32a includes a circumferential surface including a recess 322a. The recess 322a is defined by a smooth surface. This limits the occurrence of stress concentration. In the present embodiment, the recess 321a and the recess 322a are separated from each other.

In the front-rear direction, the load-side arms 29a, 30a are set to be shorter than the effort-side arms 25a, 26a in overall length. In the present embodiment, in the front-rear direction, the length L11 from the center of the through hole 271a of the fulcrum portion 27a to the center of a through hole 323a of the second connector 32a is less than the length L12 from the center of the through hole 271a to the center of the through hole 253a of the effort-side arm 25a (L11<L12).

The through hole 323a of the second connector 32a extends vertically and includes an upper end and a lower end. A tubular bushing is fitted to each of the upper end and the lower end of the through hole 323a. The bushings and a holder shaft member 33a support the pad holder 5a on the second connector 32a.

Referring to FIGS. 1, 2, 4, and 5, the pad holder 5a holds the pad 102a. The pad holder 5a includes a holder body 501a and projections 502a, 503a.

The holder body 501a is located adjacent to the inner surface 21a in the second connector 32a. The holder body 501a is plate-shaped and extends vertically. The holder body 501a has the form of an arc (the form corresponding to a portion of an annular shape) as viewed from beside. The holder body 501a and the side surface 101a of the disc 101 are opposed to each other in the lateral direction. The holder body 501a has an inner surface that includes a holding groove 504a extending vertically. The projections 502a, 503a project from an outer surface of the holder body 501a.

The projections 502a, 503a are each a small piece and formed integrally with the holder body 501a. The projection 502a is located above the second connector 32a. The projection 503a is located below the second connector 32a. In this manner, the second connector 32a is located between the projections 502a, 503a.

The projections 502a, 503a each include a through hole (not shown) extending vertically. The holder shaft member 33a is a threaded member and extends through the through hole of the projection 502a, the through hole of the second connector 32a, and the through hole of the projection 503a. The holder shaft member 33a is thread-coupled to a nut 34a. Thus, the pad holder 5a is rotationally supported by the second connector 32a. The pad holder 5a, which has the structure described above, holds the pad 102a.

The pad 102a includes a base metal 103a and a friction material 104a. The base metal 103a is partially fitted into the holding groove 504a of the pad holder 5a. In this manner, the base metal 103a is held by the pad holder 5a. The friction material 104a is fixed to the base metal 103a and opposed to the side surface 101a of the disc 101. In this structure, the pad 102a is supported by the pad holder 5a and the holder shaft member 33a on the caliper lever 3a.

The structure of the caliper lever 3a, the pad holder 5a, and the pad 102a has been described. The structure of the caliper lever 3b, the pad holder 5b, and the pad 102b at one lateral side is symmetrical to the structure of the caliper lever 3a, the pad holder 5a, and the pad 102a at the other lateral side and will not be described in detail.

More specifically, each component of the caliper lever 3b, the pad holder 5b, and the pad 102b is denoted by reference characters in which the numeral is the same as that of the corresponding component of the caliper lever 3a, the pad holder 5a, and the pad 102a and the alphabet "a" is replaced by "b". For example, reference characters of effort-side arms of the caliper lever 3b, which correspond to the effort-side arms 25a, 26a of the caliper lever 3a, are denoted by "effort-side arms 25b, 26b". The effort-side arms 25b, 26b of the caliper lever 3b each include a first end. The threaded members 15b, 15b, which have been described above, are coupled to the first ends of the effort-side arms 25b, 26b, respectively.

Referring to FIGS. 3 and 5, a synchronization mechanism 36, which is used to orient the pad holders 5a, 5b in the same direction, is located below the caliper levers 3a, 3b. The synchronization mechanism 36 is, for example, a link mechanism, and includes two first members 37a, 37b and second members 38, 38.

The first members 37a, 37b are flexible and each formed by bending a metal plate. The first members 37a, 37b each include a first end fixed to the corresponding one of the holder bodies 501a, 501b. The first members 37a, 37b extend in the front-rear direction. The first members 37a, 37b each include a second end. The second ends of the first members 37a, 37b are coupled by the second members 38, 38. The second members 38, 38 each have the form of a round rod and extend in the lateral direction.

Figure 11:
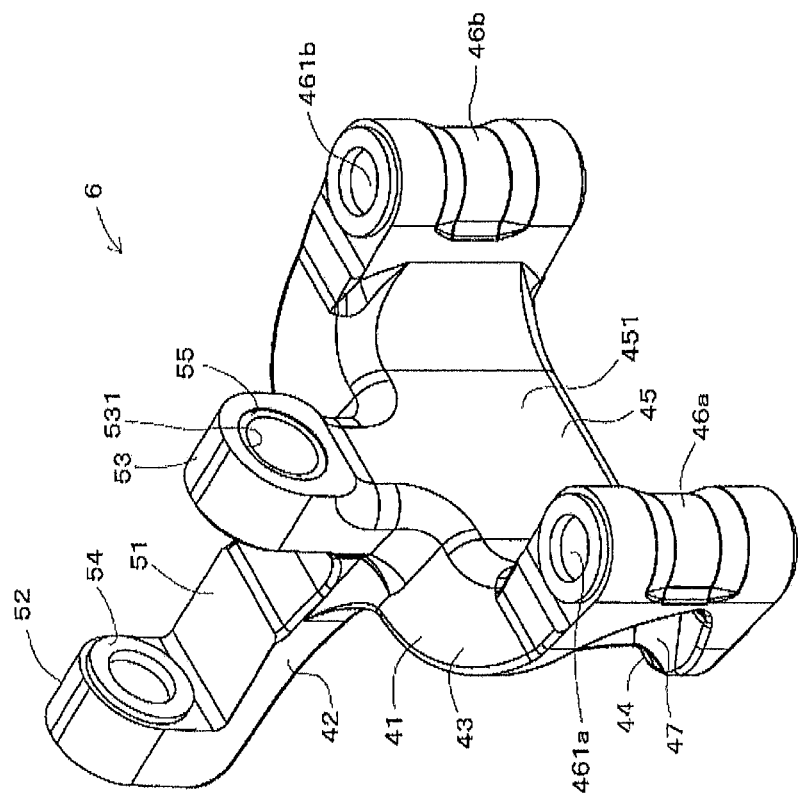
FIG. 11 is a perspective view of a lever support member as viewed from above.
Figure 12:
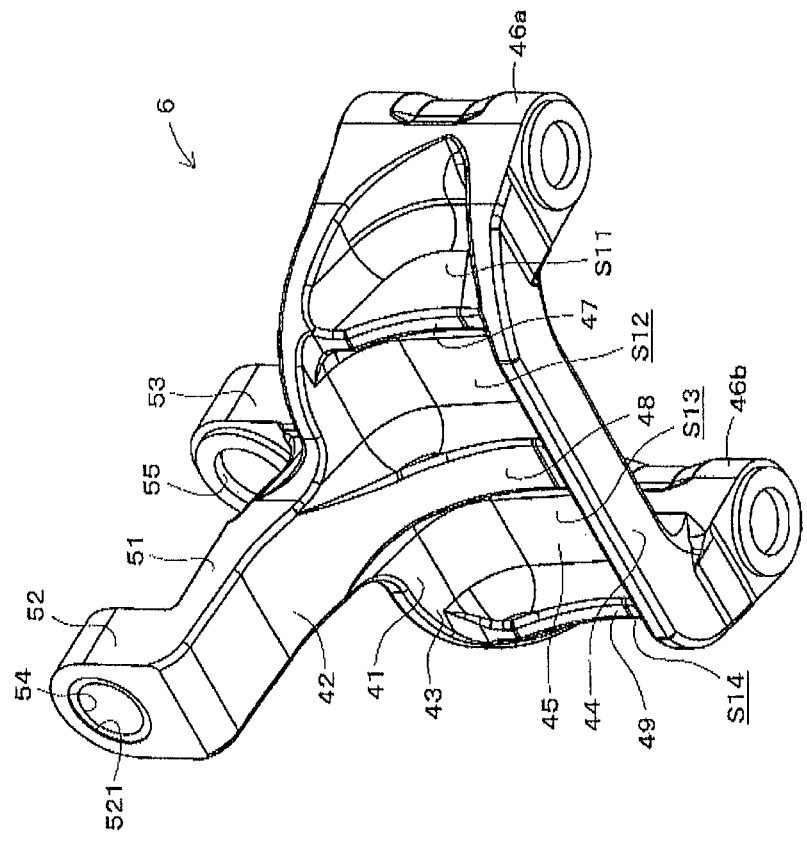
FIG. 12 is a perspective view of the lever support member as viewed from below.

The structure of the lever support member 6, which supports the caliper levers 3a, 3b with the fulcrum shaft members 4a, 4b, will now be described. FIG. 11 is a perspective view of the lever support member 6 as viewed from above. FIG. 12 is a perspective view of the lever support member 6 as viewed from below.

Referring to FIGS. 1, 2, 4, 11, and 12, the lever support member 6 is located between the caliper levers 3a, 3b. Additionally, the lever support member 6 is located between the cylinder device 2 and the disc 101.

The lever support member 6 is formed from a metal material or the like. In the present embodiment, the lever support member 6 is a component integrally formed by casting, forging, sintering, or other manufacturing processes. The lever support member 6 is a solid member. The lever support member 6 is Y-shaped in a plan view.

The lever support member 6 includes a first part 41 and a second part 42.

The first part 41 is coupled to the caliper levers 3a, 3b. The first part 41 is U-shaped in a plan view. The first part 41 includes horizontal portions 43, 44, a vertical portion 45, two coupling portions 46a, 46b, and reinforcement ribs 47, 48, 49.

The horizontal portions 43, 44 are located one above the other and extend generally orthogonal to the axis of the fulcrum shaft member 4a (4b). In the present embodiment, the fulcrum shaft member 4a extends generally vertically. The horizontal portions 43, 44 extend generally horizontally. The horizontal portions 43, 44 extend parallel to each other. The horizontal portions 43, 44 extend in the lateral direction, or a layout direction in which the caliper levers 3a, 3b and the cylinder device 2 are laid out.

The horizontal portions 43, 44 are elongated in the lateral direction and each include a side part opposed to the disc 101. The side parts of the horizontal portions 43, 44 are connected to each other by the vertical portion 45.

The vertical portion 45 extends in the lateral direction and in a direction in which the horizontal portions 43, 44 are opposed to each other. The vertical portion 45 connects the horizontal portions 43, 44. The vertical portion 45 extends parallel to the axes of the fulcrum shaft members 4a, 4b. In the present embodiment, the vertical portion 45 extends generally vertically. The vertical portion 45 includes a side surface 451 that is opposed to the disc 101 in the front-rear direction. The vertical portion 45 and the horizontal portions 43, 44 each include two lateral ends, which are continuous with the coupling portions 46a, 46b, respectively.

The coupling portion 46a extends so that the coupling portion 46a is located between the fulcrum portions 27a, 28a of the caliper lever 3a.

The coupling portion 46a is tubular and extends vertically. The coupling portion 46a includes a through hole 461a extending vertically. The through hole 461a includes an upper end and a lower end. A bushing is fitted into each of the upper end and the lower end of the through hole 461a. The fulcrum shaft 9a of the fulcrum shaft member 4a extends through the through hole of the fulcrum portion 27a, the through hole 461a of the coupling portion 46a, and the through hole of the fulcrum portion 28a and is thread-coupled to a nut 50a.

In the above structure, the fulcrum portions 27a, 28a of the caliper lever 3a are pivotally supported by the fulcrum shaft 9a of the fulcrum shaft member 4a and the coupling portion 46a of the lever support member 6. More specifically, the caliper lever 3a is pivotally supported by the fulcrum shaft 9a and the coupling portion 46a so that the pad 102a is movable in directions extending toward the disc 101 and away from the disc 101.

The coupling portion 46b has the same structure as the coupling portion 46a. The coupling portion 46b extends so that the coupling portion 46b is located between the fulcrum portions 27b, 28b of the caliper lever 3b.

The coupling portion 46b is tubular and extends vertically. The coupling portion 46b includes a through hole 461b extending vertically. The through hole 461b includes an upper end and a lower end. A bushing is fitted into each of the upper end and the lower end of the through hole 461b. The fulcrum shaft 9b of the fulcrum shaft member 4b extends through the through hole of the fulcrum portion 27b, the through hole 461b of the coupling portion 46b, and the through hole of the fulcrum portion 28b and is thread-coupled to a nut 50b.

In the above structure, the fulcrum portions 27b, 28b of the caliper lever 3b are pivotally supported by the fulcrum shaft 9b of the fulcrum shaft member 4b and the coupling portion 46b of the lever support member 6. More specifically, the caliper lever 3b is pivotally supported by the fulcrum shaft 9b and the coupling portion 46b so that the pad 102b is movable in directions extending toward the disc 101 and away from the disc 101.

The reinforcement ribs 47, 48, 49 are located adjacent to the coupling portions 46a, 46b, which have the structure described above.

The reinforcement ribs 47, 48, 49 reinforce the first part 41 and are connected to the horizontal portions 43, 44 and the vertical portion 45. The reinforcement ribs 47, 48, 49 are opposed to the cylinder device 2 in the front-rear direction and extend orthogonal to the vertical portion 45. The reinforcement ribs 47, 48, 49 are each plate-shaped and extend in the front-rear direction and in the vertical direction. In the present embodiment, the reinforcement ribs 47, 48, 49 are separated in the lateral direction. The reinforcement ribs 47, 48, 49 extend from the vertical portion 45 toward the cylinder device 2. The reinforcement ribs 47, 48, 49 each include an upper end, which is continuous with the horizontal portion 43. The reinforcement ribs 47, 48, 49 each include a lower end, which is continuous with the horizontal portion 44.

The reinforcement rib 47 is located toward the coupling portion 46a. The reinforcement rib 47 includes portions connected to the horizontal portions 43 and 44, the vertical portion 45, and the coupling portion 46a, respectively. Each connected portion of the reinforcement rib 47 has a smooth form. This limits the occurrence of stress concentration.

The reinforcement rib 48 is located on the middle of the lever support member 6 in the lateral direction. The reinforcement rib 48 is set to be thicker (longer in the lateral direction) than each of the reinforcement ribs 47, 49. The reinforcement rib 48 includes portions connected to the horizontal portions 43, 44, the vertical portion 45, and a base 51, respectively. Each connected portion of the reinforcement rib 48 has the form of a smooth arc. This limits the occurrence of stress concentration.

The reinforcement rib 49 at one lateral side is shaped to be symmetrical to the reinforcement rib 47 at the other lateral side. The reinforcement rib 49 is located toward the coupling portion 46b. The reinforcement rib 49 includes portions connected to the horizontal portions 43, 44, the vertical portion 45, and the coupling portion 46b, respectively. Each connected portion of the reinforcement rib 49 has the form of a smooth arc. This limits the occurrence of stress concentration.

The reinforcement rib 47, the horizontal portions 43, 44, the vertical portion 45, and the coupling portion 46a define a cavity S11, which is opposed to the cylinder device 2. The reinforcement ribs 47, 48, the horizontal portions 43, 44, and the vertical portion 45 define a cavity S12, which is opposed to the cylinder device 2.

The reinforcement ribs 48, 49, the horizontal portions 43, 44, and the vertical portion 45 define a cavity S13, which is opposed to the cylinder device 2. The reinforcement rib 49, the horizontal portions 43, 44, the vertical portion 45, and the coupling portion 46b define a cavity S14, which is opposed to the cylinder device 2.

The cavities S11, S14 are each tapered so that the height (length in the vertical direction) decreases as the distal end of the corresponding one of the coupling portions 46a, 46b becomes closer. The volume of the lever support member 6 is reduced by the volume of the cavities S11 to S14. This reduces the weight of the lever support member 6. The second part 42 is located above the first part 41, which has the structure described above.

The second part 42 is coupled to a fixing bracket 8 by the suspension shaft member 7. The second part 42 includes the base 51 and two coupling portions 52, 53.

The base 51 has the form of a plate extending in the front-rear direction from the lateral middle of the horizontal portion 43. The base 51 extends from the horizontal portion 43 toward the cylinder device 2. The lower portion of the base 51 is continuous with the upper portion of the reinforcement rib 48. The base 51 includes two opposite ends, in the front-rear direction, which are continuous with the coupling portions 52, 53, respectively.

The suspension shaft member 7 is inserted into the coupling portions 52, 53. The coupling portions 52, 53 are each block-shaped and project upward from the base 51. The coupling portion 52 is located adjacent to the cylinder device 2 and the effort-side arms 25a, 25b of the caliper levers 3a, 3b. The coupling portion 53 is located adjacent to the disc 101 and load-side arms 29a, 29b of the caliper levers 3a, 3b. The coupling portions 52, 53 respectively include through holes 521, 531 extending in the front-rear direction. The diameter of the through hole 521, which is adjacent to the effort-side arms 25a, 25b, is set to be smaller than the diameter of the through hole 531, which is adjacent to the load-side arms 29a, 29b. Tubular bushings 54, 55 are fitted into the through holes 521, 531, respectively. The coupling portions 52, 53 are supported by the bushings 54, 55 and the suspension shaft member 7 on the fixing bracket 8.

The fixing bracket 8 is formed from a metal material or the like. In the present embodiment, the fixing bracket 8 is a component integrally formed by casting, forging, sintering, or other manufacturing processes. The fixing bracket 8 includes a bracket body 56. The bracket body 56 includes a generally tetragonal plate 57 and effort-side fixing portions 58, 59 and load-side fixing portions 60, 61, which respectively project from the four corners of the plate 57.

The effort-side fixing portions 58, 59 extend from the plate 57 toward the effort-side arms 25a, 25b, respectively, in a plan view. The effort-side fixing portions 58, 59 each include a through hole, which receives a threaded member (not shown). The threaded members are fastened to the lower portion of the chassis 100.

The load-side fixing portions 60, 61 extend from the plate 57 toward the load-side arms 29a, 29b, respectively, in a plan view. The load-side fixing portions 60, 61 each include a through hole, which receives a threaded member (not shown). The threaded members are fastened to the lower portion of the chassis 100.

In this structure, the fixing bracket 8 is fixed to the chassis 100.

Figure 13:
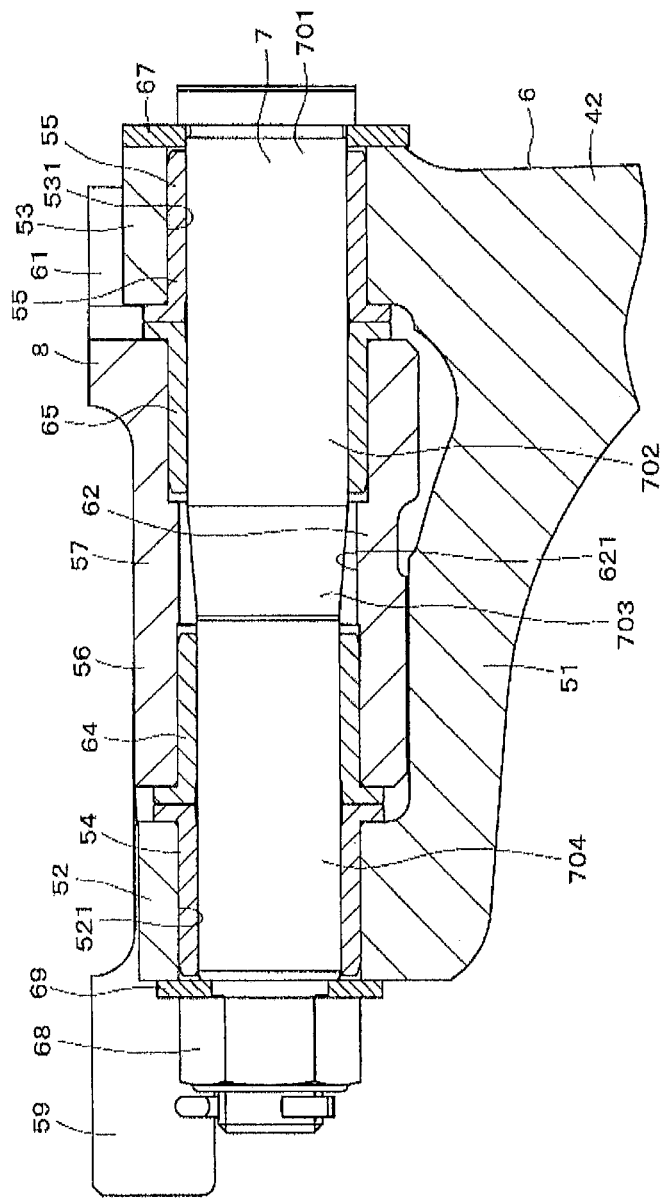
FIG. 13 is a cross-sectional view taken along line XIII-XIII of FIG. 2.

FIG. 13 is a cross-sectional view taken along line XIII-XIII of FIG. 2. Referring to FIGS. 4 and 13, the fixing bracket 8 further includes a shaft holder 62 extending toward a lower side of the bracket body 56.

The shaft holder 62 has the form of a tube extending in the front-rear direction and is located between the coupling portions 52, 52 of the lever support member 6. The shaft holder 62 includes a through hole 621 extending in the front-rear direction. A tubular bushing 64 is fitted into the through hole 621 at a location adjacent to the coupling portion 52. Also, a tubular bushing 65 is fitted into the through hole 621 at a location adjacent to the coupling portion 53.

The inner diameter of the bushing 64 is set to be the same as the inner diameter of the bushing 54, which is fitted into the coupling portion 52, and smaller than the inner diameter of the bushing 65. The inner diameter of the bushing 65 is set to be the same as the inner diameter of the bushing 55, which is fitted into the coupling portion 53.

The suspension shaft member 7 includes a suspension shaft 701, which is inserted into the bushings 55, 65, 64, 54. In the present embodiment, the suspension shaft member 7 is a threaded member, such as a shoulder bolt. The suspension shaft 701 of the suspension shaft member 7 has a first end that includes a head. A washer 67 is fitted to the suspension shaft 701. The washer 67 is located between the head of the suspension shaft member 7 and an end surface of the coupling portion 53. The suspension shaft 701 includes a second end, to which a nut 68 is thread-coupled. A washer 69 is located between the nut 68 and the coupling portion 52. Thus, the lever support member 6 is suspended by the suspension shaft 701 from the fixing bracket 8 and is pivotal about the suspension shaft 701, which extends in the front-rear direction.

The suspension shaft 701 includes a large diameter portion 702 having the form of a round rod, a tapered portion 703, and a small diameter portion 704 having the form of a round rod.

The large diameter portion 702 is located toward the fulcrum shaft members 4a, 4b (pads 102a, 102b) and inserted into the bushings 55, 65. The tapered portion 703 is located between the large diameter portion 702 and the small diameter portion 704. The tapered portion 703 is tapered so that the tapered portion 703 has the form of a truncated cone the diameter of which decreases as the distance from the large diameter portion 702 increases.

The small diameter portion 704 is located adjacent to the cylinder device 2 and is greatly separated from the fulcrum shaft members 4a, 4b. The distance from the fulcrum shaft members 4a, 4b to the small diameter portion 704 is greater than the distance from the fulcrum shaft members 4a, 4b to the large diameter portion 702. The diameter of the small diameter portion 704 is set to be smaller than the diameter of the large diameter portion 702. In this manner, the diameter of the small diameter portion 704, which is located at the side of the effort-side arms 25a, 25b of the caliper levers 3a, 3b, is set to be smaller than the diameter of the large diameter portion 702, which is located at the side of the load-side arms 29a, 29b of the caliper levers 3a, 3b. The small diameter portion 704 is inserted into the bushings 64, 54.

Referring to FIGS. 1 and 2, the brake apparatus 1, which has the structure described above, operates when applying the brakes on the vehicle. More specifically, when the cylinder device 2 is driven, the rod 11 of the cylinder device 2 is pushed out from the cylinder housing 10. This increases the distance between the effort-side arms 25a, 25b of the caliper levers 3a, 3b and the distance between the effort-side arms 26a, 26b of the caliper levers 3a, 3b. Thus, the caliper levers 3a, 3b pivot about the fulcrum shafts 9a, 9b of the fulcrum shaft members 4a, 4b, respectively. The pivoting decreases the distance between the second connectors 32a, 32b of the caliper levers 3a, 3b. Consequently, the pads 102a, 102b are respectively pressed onto the side surfaces 101a, 101b of the disc 101.

Figure 14:
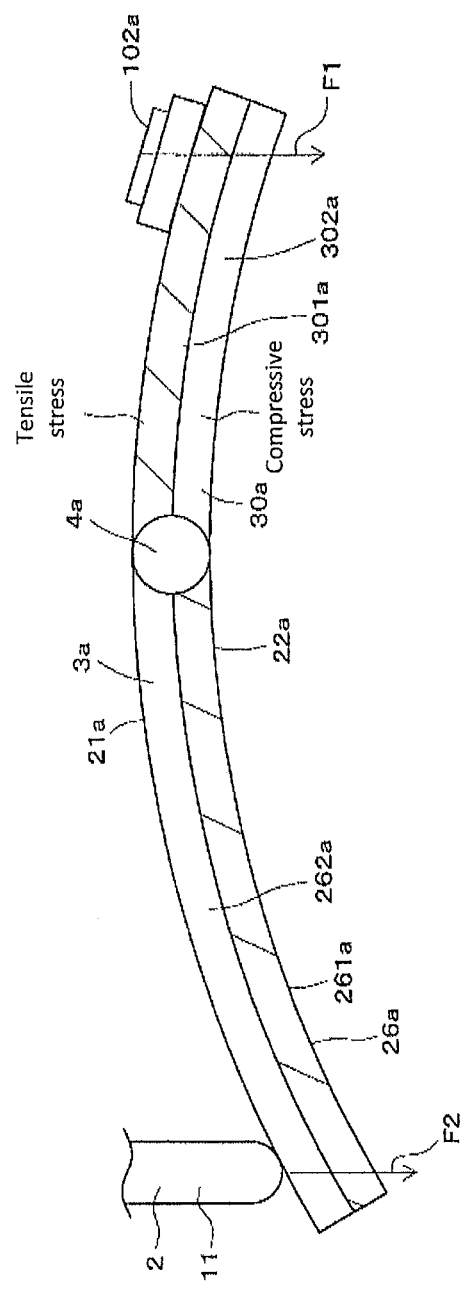
FIG. 14 is a schematic plan diagram of a main portion illustrating the operation of the brake apparatus.

FIG. 14 is a schematic plan diagram of a main portion illustrating the operation of the brake apparatus 1. As shown in FIG. 14, the caliper lever 3a receives a reaction force F1 from the disc (not shown in FIG. 14) through the pad 102a and the like and a driving force F2 from the rod 11 of the cylinder device 2. This moves the two opposite ends, in the front-rear direction, of the caliper lever 3a toward the outer surface 22a of the caliper lever 3a. More specifically, the caliper lever 3a warps into an arch-like shape. As a result, tensile stress is generated in the periphery of the inner surface 21a of the caliper lever 3a. In contrast, compressive stress is generated in the periphery of the outer surface 22a of the caliper lever 3a. In FIG. 14, the warpage amount of the caliper lever 3a is exaggerated. In this case, although not shown in FIG. 14, the caliper lever 3b at one lateral side warps in a symmetrical shape of the caliper lever 3a at the other lateral side.

As described above, in the brake apparatus 1 of the present embodiment, the effort-side arms 25a, 26a and the load-side arms 29a, 30a of the caliper lever 3a each have a polygonal cross-section including an omitted portion (in the present embodiment, L-shaped). The cross-section is orthogonal to the direction in which the arm extends. This reduces the volume of each of the effort-side arms 25a, 26a and the load-side arms 29a, 30a. Thus, the arms 25a, 26a, 29a, 30a may be further reduced in weight. More specifically, the reduction in the weight of the caliper lever 3a reduces the weight of the brake apparatus 1. Additionally, the effort-side arms 25a, 26a and the load-side arms 29a, 30a of the caliper lever 3a each have the form having sufficient bending rigidity. Thus, the arms 25a, 26a, 29a, 30a, which receive large loads from the cylinder device 2 and large reaction forces from the disc 101, each may obtain sufficient strength. This provides the brake apparatus 1 that obtains sufficient strength and is reduced in weight.

The operation and advantages of the caliper lever 3b are the same as those of the caliper lever 3a and will not be described in detail.

In the brake apparatus 1, in the cross-section P1 of the effort-side arm 25a, which is orthogonal to the arm 25a, the angle θ251a between the first part 251a and the vertical direction is smaller than the angle θ252a between the second part 252a and the vertical direction (θ251a<θ252a). In the same manner, in the cross-section P2 of the load-side arm 29a, which is orthogonal to the arm 29a, the angle θ291a between the first part 291a and the vertical direction is smaller than the angle θ292a between the second part 292a and the vertical direction (θ291a<θ292a). In this structure, the first parts 251a, 291a, each of which extends at an angle relatively close to the vertical line, cooperate with the second parts 252a, 292a, each of which extends at an angle relatively close to the horizontal line, to allow each of the effort-side arm 25a and the load-side arm 29a to obtain sufficient bending rigidity. The effort-side arm 26a and the load-side arm 30a have the same advantage.

In the brake apparatus 1, the effort-side arms 25a, 26a and the load-side arms 29a, 30a are each L-shaped in a cross-section orthogonal to the corresponding arm. This structure allows each of the effort-side arms 25a, 26a and the load-side arms 29a, 30a to be reduced in weight and obtain sufficient rigidity in a simple manner.

In the brake apparatus 1, the first parts 251a, 261a of the effort-side arms 25a, 26a are each located at the side of the outer surface 22a of the caliper lever 3a. The second parts 252a, 262a of the effort-side arms 25a, 26a are each located at the side of the inner surface 21a of the caliper lever 3a. This structure obtains the cavity S1a defined by the first part 251a and the second part 252a at the side of the inner surface 21a in the effort-side arm 25a. In the same manner, a cavity defined by the first part 261a and the second part 262a may be obtained. Thus, the boot 14 or the like of the cylinder device 2, which is located adjacent to the effort-side arms 25a, 26a, may be located in the cavities, such as the cavity S1a. This prevents interference (unintentional contact) of the effort-side arms 25a, 26a with the cylinder device 2 or the like. Moreover, the effort-side arms 25a, 26a do not need to have a circuitous shape to avoid such interference. This reduces the effort-side arms 25a, 26b in size. Particularly, the effort-side arms 25a, 26b may be shortened in the front-rear direction.

In the brake apparatus 1, the first parts 291a, 301a of the load-side arms 29a, 30a are each located at the side of the inner surface 21a of the caliper lever 3a. The second parts 292a, 302a of the load-side arms 29a, 30a are each located at the side of the outer surface 22a of the caliper lever 3a. In this structure, when applying the brakes on the vehicle, the load-side arms 29a, 30a each receive a reaction force from the disc 101 and warp in an arch-like shape. In this case, in the load-side arms 29a, 30a, tensile stress is generated at the side of the inner surface 21a, and compressive stress is generated at the side of the outer surface 22a. In general, a component has a tensile stress tolerance that is lower than a compressive stress tolerance. Thus, in the load-side arms 29a, 30a, the first parts 291a, 301a are located at the side of the inner surface 21a, in which tensile stress is generated when applying the brakes on the vehicle. This further increases the volume of a portion receiving the tensile stress and decreases the peak of the tensile stress of the load-side arms 29a, 30a. Consequently, such a decrease in the load of the load-side arms 29a, 30a further increases the strength of the caliper lever 3a.

In the brake apparatus 1, the load-side arms 29a, 30a are each set to be shorter than the effort-side arms 25a, 26a in overall length. This structure, in which the load-side-arms 29a, 30a are short in overall length, further reduces the size of the brake apparatus 1. Since the load-side arms 29a, 30a are short in overall length, when applying the brakes on the vehicle, the stress of the load-side arms 29a, 30a tends to be increased when the load-side arms 29a, 30a warp due to the reaction force from the disc 101. However, in the load-side arms 29a, 30a, the first parts 291a, 301a are located at the side of the inner surface 21a of the load-side arms 29a, 30a. This disperses the tensile stress at the side of the inner surface 21a in each of the load-side arms 29a, 30a and decreases the peak of the tensile stress generated in the load-side arms 29a, 30a to a sufficiently low value.

In the brake apparatus 1, the effort-side arms 25a, 26a are located one above the other. Further, the caliper lever 3a includes the first connector 31a, which connects the first parts 251a, 261a of the effort-side arms 25a, 26a. In this structure, the effort-side arms 25a, 26a are located one above the other and integrally connected to each other by the first connector 31a. This significantly improves the strength of the effort-side arms 25a, 26a. Such improved strength of the effort-side arms 25a, 26b further increases the strength of the caliper lever 3a. Additionally, the first connector 31a extends between the first parts 251a, 261a of the effort-side arms 25a; 26a. Thus, portions connecting the first connector 31a and the effort-side arms 25a, 26a may be smoothly formed. This loosens the stress concentration on the portions connecting the first connector 31a and the effort-side arms 25a, 26a.

In the brake apparatus 1, the lever support member 6 includes the horizontal portions 43, 44 located one above the other, the vertical portion 45, and the reinforcement ribs 47, 48, 49. This structure allows the lever support member 6 to have a form similar to combined plates rather than the form of a block. Thus, the lever support member 6 may be further reduced in weight. The reinforcement ribs 47, 48 allow the lever support member 6 to obtain sufficient strength.

In the brake apparatus 1, the vertical portion 45 is configured to be opposed to the disc 101. The reinforcement ribs 47, 48, 49 extend from the vertical portion 45 toward the cylinder device 2. In this structure, the vertical portion 45 is located proximate to the disc 101. Thus, in the lever support member 6, the vertical portion 45 may assuredly receive the reaction force from the disc 101.

In the brake apparatus 1, the suspension shaft 701 includes the small diameter portion 704, which is located toward the cylinder device 2, and the large diameter portion 702, which is located toward the pad 102a and has a larger diameter than the small diameter portion 704. In this structure, in the suspension shaft 701, when applying the brakes on the vehicle, the large diameter portion 702 receives a large reaction force from the disc 101. Thus, the diameter of the large diameter portion 702 is set to be large so that the suspension shaft 701 obtains sufficient strength. Additionally, when applying the brakes on the vehicle, the small diameter portion 704 receives a relatively small reaction force from the disc 101. Thus, the small diameter portion 704, which serves as a portion of the suspension shaft 701 that is free from a large load, has a small diameter. This reduces the weight of the suspension shaft 701.

Although the embodiment of the present invention has been described, the present invention is not limited to the above embodiment and may be embodied in many other specific forms within the scope and equivalence of the appended claims. For example, the embodiment may be modified as follows.

(1) In the embodiment, each caliper lever includes the load-side arms that are located one above the other and inclined so that the arms become closer to each other toward the pad holder. The inclination angle may be larger or smaller than the value shown in the drawing of the embodiment.

(2) In the embodiment, each arm of each caliper lever includes the first part and the second part that are orthogonal to each other. However, there is no limit to such a shape. For example, in a cross-section orthogonal to the direction the arm extends, the first part and the second part of the arm only need to extend and intersect each other. The intersecting angle is not limited particularly.

(3) In the embodiment, each arm of each caliper lever includes the first part and the second part that are L-shaped as a whole. However, there is no limit to such a shape. For example, in a cross-section orthogonal to the direction the arm extends, the first part and the second part of the arm may have a different shape and, for example, be I-shaped.

(4) In the embodiment, in the effort-side arm, the first part is located at the side of the outer surface of the caliper lever relative to the second part. However, there is no limit to such a configuration. For example, in the effort-side arm, the first part may be located at the side of the inner surface of the caliper lever relative to the second part.

(5) In the embodiment, in the load-side arm, the first part is located at the side of the inner surface of the caliper lever relative to the second part. However, there is no limit to such a configuration. For example, in the load-side arm, the first part may be located at the side of the outer surface of the caliper lever relative to the second part.

(6) In the embodiment, the shaft of the suspension shaft member includes the large diameter portion and the small diameter portion. However, there is no limit to such a configuration. For example, the shaft of the suspension shaft member may have a constant diameter.

(7) In the embodiment, each arm of the two caliper levers includes the first part and the second part intersecting each other. However, there is no limit to such a configuration. For example, one of the caliper levers does not have to include the first part and the second part intersecting each other.

(8) In the embodiment, the caliper levers 3a, 3b are each formed by a solid member. However, the caliper levers 3a, 3b may be partially or entirely formed by a hollow member. In this case, the weight may be further reduced while obtaining the strength. Additionally, in the same manner, the lever support member 6 may be formed by a hollow member.

INDUSTRIAL APPLICABILITY

The present invention is widely applicable to a railway vehicle disc brake apparatus.

DESCRIPTION OF REFERENCE CHARACTERS

1 railway vehicle disc brake apparatus
2 cylinder device (drive device)
3a, 3b caliper lever
9a, 9b fulcrum shaft
25a, 26a, 25b, 26b effort-side arm
29a, 30a, 29b, 30b load-side arm
101 disc
102a, 102b pad
251a, 261a, 291a, 301a, 251b, 261b, 291b, 301b first part
252a, 262a, 292a, 302a, 252b, 262b, 292b, 302b second part
P1, P2 cross-section (cross-section orthogonal to a direction an arm extends)

The invention claimed is:

1. A railway vehicle disc brake apparatus comprising:
a caliper lever that supports a pad, which is opposed to a disc;
a fulcrum shaft that pivotally supports the caliper lever so that the pad is movable in a direction extending toward the disc and in a direction extending away from the disc; and
a drive device that drives the caliper lever about the fulcrum shaft,
wherein the caliper lever includes at least two arms pivotable with the caliper lever about the fulcrum shaft, and each said arm includes a first part and a second part that extend and intersect each other in a cross-section orthogonal to a direction in which the arm extends,
wherein during use of the railway vehicle disc brake apparatus, in the cross-section, an angle between a vertical direction and a direction in which the first part extends is smaller than an angle between the vertical direction and a direction in which the second part extends,
wherein the arm is arranged so that an inner surface of the caliper lever is opposed to the drive device and an outer surface of the caliper lever is arranged to be paired with the inner surface of the caliper lever, the at least two arms include:
an effort-side arm that extends between the drive device and the fulcrum shaft, and
a load-side arm that extends from a side of the fulcrum shaft toward a side of the pad,
in the effort-side arm, the first part is located at a side of the outer surface of the caliper lever and the second part is located at a side of the inner surface of the caliper lever, and
in the load-side arm, the first part is located at a side of the inner surface of the caliper lever and the second part is located at a side of the outer surface of the caliper lever.

2. The railway vehicle disc brake apparatus according to claim 1, wherein each said arm is L-shaped in the cross-section.

3. The railway vehicle disc brake apparatus according to claim 1, wherein the load-side arm is set to be shorter in overall length than the effort-side arm.

4. The railway vehicle disc brake apparatus according to claim 1, wherein the effort-side arm is one of two effort-side arms located one above the other, and the caliper lever further includes a connector that connects the first parts of the effort-side arms.

5. The railway vehicle disc brake apparatus according to claim 1, further comprising: a lever support member that supports the caliper lever with the fulcrum shaft, wherein the lever support member includes
two horizontal portions that are located one above the other and extend in a predetermined layout direction in which the caliper lever and the drive device are laid out,
a vertical portion that extends in a direction in which the two horizontal portions are opposed to each other and connects the two horizontal portions, and
a reinforcement rib connected to the two horizontal portions and the vertical portion.

6. The railway vehicle disc brake apparatus according to claim 5, wherein the vertical portion is configured to be opposed to the disc, and the reinforcement rib extends from the vertical portion toward the drive device.

7. The railway vehicle disc brake apparatus according to claim 5, further comprising: a suspension shaft that pivotally suspends the lever support member from a chassis,
wherein the suspension shaft includes
a small diameter portion located toward the drive device, and
a large diameter portion that is configured to be located toward the pad and has a larger diameter than the small diameter portion.

\* \* \* \* \*